US011004204B2

United States Patent
Zhang et al.

(10) Patent No.: US 11,004,204 B2
(45) Date of Patent: May 11, 2021

(54) SEGMENTATION-BASED DAMAGE DETECTION

(71) Applicant: Advanced New Technologies Co., Ltd., Grand Cayman (KY)

(72) Inventors: Wei Zhang, Hangzhou (CN); Wei Chu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/945,774

(22) Filed: Jul. 31, 2020

(65) Prior Publication Data
US 2020/0380692 A1 Dec. 3, 2020

Related U.S. Application Data

(63) Continuation of application No. 16/808,208, filed on Mar. 3, 2020, now Pat. No. 10,783,643, which is a
(Continued)

(30) Foreign Application Priority Data

May 27, 2019 (CN) .......................... 201910447785.X

(51) Int. Cl.
*G06K 9/00* (2006.01)
*G06T 7/12* (2017.01)
(Continued)

(52) U.S. Cl.
CPC .............. *G06T 7/12* (2017.01); *G06K 9/6261* (2013.01); *G06T 7/0002* (2013.01); *G06T 7/11* (2017.01);
(Continued)

(58) Field of Classification Search
CPC . G06T 7/12; G06T 7/11; G06T 7/0002; G06T 2207/20084; G06T 2207/20081;
(Continued)

(56) References Cited

U.S. PATENT DOCUMENTS 9,218,626 B1 12/2015 Haller, Jr. et al.
10,255,521 B2 * 4/2019 Amico ................. H04N 1/6002
(Continued)

FOREIGN PATENT DOCUMENTS

CN 104134234 11/2014
CN 106295678 1/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tom Y Lu
(74) *Attorney, Agent, or Firm* — Fish & Richardson P.C.

(57) ABSTRACT

A computer-implemented method includes: obtaining a sample picture and corresponding mark data, in which the mark data includes a first damage mark outline, and in which the first damage mark outline frames a damaged object in the sample picture; determining a segmentation type for a plurality of pixels in the sample picture based on the first damage mark outline, to generate segmentation mark data; inputting the sample picture to a weak segmentation damage detection model, in which the weak segmentation damage detection model includes an outline prediction branch and a segmentation prediction branch, in which the outline prediction branch outputs outline prediction data including a damage prediction outline, the damage prediction outline framing a predicted damaged object in the sample picture,
(Continued)

and in which the segmentation prediction branch includes segmentation prediction data including a predicted segmentation type of each pixel of the plurality of pixels.

20 Claims, 9 Drawing Sheets

Related U.S. Application Data continuation of application No. PCT/CN2020/072058, filed on Jan. 14, 2020.

(51) Int. Cl.
*G06T 7/00* (2017.01)
*G06T 7/11* (2017.01)
*G06K 9/62* (2006.01)

(52) U.S. Cl.
CPC .............. *G06T 2207/20076* (2013.01); *G06T 2207/20081* (2013.01); *G06T 2207/20084* (2013.01); *G06T 2207/30204* (2013.01); *G06T 2207/30248* (2013.01)

(58) Field of Classification Search
CPC . G06T 2207/20076; G06T 2207/30248; G06T 2207/30204; G06K 9/6261
See application file for complete search history.

(56) References Cited

U.S. PATENT DOCUMENTS

| | | | |
|---|---|---|---|
| 10,319,094 B1 | 6/2019 | Chen et al. | |
| 10,572,944 B1 * | 2/2020 | Brandmaier | G06Q 40/08 |
| 10,706,321 B1 * | 7/2020 | Chen | G06T 7/001 |
| 10,740,891 B1 * | 8/2020 | Chen | G06T 7/001 |
| 10,783,643 B1 | 9/2020 | Zhang et al. | |
| 2018/0061091 A1 | 3/2018 | Wang | |
| 2018/0144209 A1 | 5/2018 | Kim et al. | |
| 2018/0240194 A1 * | 8/2018 | Dong | G06Q 30/0185 |
| 2018/0260793 A1 | 9/2018 | Li et al. | |
| 2019/0087425 A1 | 3/2019 | Kim et al. | |
| 2020/0074178 A1 | 3/2020 | Guo | |
| 2020/0074560 A1 | 3/2020 | Xu | |

FOREIGN PATENT DOCUMENTS

| | | |
|---|---|---|
| CN | 106855944 | 6/2017 |
| CN | 108109152 | 6/2018 |
| CN | 109002834 | 12/2018 |
| CN | 109145903 | 1/2019 |
| CN | 109242006 | 1/2019 |
| CN | 109255790 | 1/2019 |
| CN | 109325488 | 2/2019 |
| CN | 109584248 | 4/2019 |
| CN | 109615649 | 4/2019 |
| CN | 109635694 | 4/2019 |
| CN | 110264444 | 9/2019 |

OTHER PUBLICATIONS

Hengxin, "Damage Detection and Recognition of Aircraft Surface Image Using Deep Network.", Beijing University of Posts and Telecommunication, 2018, 64 pages (with English abstract).

Nakamoto, "Bitcoin: A Peer-to-Peer Electronic Cash System," www.bitcoin.org, 2005, 9 pages.

PCT International Search Report and Written Opinion in International Appln No. PCT/CN2020/072058, dated Apr. 17, 2020, 14 pages [with partial English machine translation].

\* cited by examiner

SEGMENTATION-BASED DAMAGE DETECTION

CROSS-REFERENCE TO RELATED APPLICATIONS

This application is a continuation of claims the benefit of priority of U.S. patent application Ser. No. 16/808,208, filed Mar. 3, 2020, which is a continuation of PCT Application No. PCT/CN2020/072058, filed on Jan. 14, 2020, which claims priority to Chinese Patent Application No. 201910447785.X, filed on May 27, 2019, and each application is hereby incorporated by reference in their entirety.

TECHNICAL FIELD

One or more implementations of the present specification relate to the field of machine learning, and in particular, to methods and apparatuses for performing damage detection based on weak segmentation by using machine learning.

BACKGROUND

With rapid development of machine learning, various artificial intelligence technologies have been applied to a plurality of scenarios to help people alleviate technical problems in corresponding scenarios. Computer vision image recognition technologies have been applied to a plurality of scenarios in a plurality of fields, for example, medical image analysis.

Computer vision techniques have been attempted in the insurance industry because damage assessments require significant human efforts. However, conventional techniques are generally unsuitable to perform such analyses. For example, in a conventional vehicle insurance claims scenario, an insurance company needs to designate a professional surveyor and a professional loss assessor to make a survey and assess a loss at an accident scene, provide a repair solution and a compensation amount for a vehicle, take a photo at the scene, and maintain the loss assessment photo for review by a reviewer at the back end. The insurance company needs to invest substantial manpower costs and expertise training costs due to manual survey and loss assessment. In terms of experience of a common user, the claims period lasts for one to three days because the claims process involves taking a photo at the scene by the surveyor, assessing a loss by the assessor at the repair place, and reviewing the loss by the reviewer at the back end. Consequently, the user needs to wait for a long time, and user experience is poor. For such industry disadvantages, it is desired that the image recognition technologies can be used to automatically recognize, based on a damage picture taken by a common user at a scene, a vehicle damage condition reflected in the picture, and automatically provide a repair solution. In this case, no manual survey, loss assessment, and loss review are needed, and therefore costs of the insurance company can be greatly reduced, and vehicle insurance claims experience of the common user can be improved.

In medical image analysis, it is also desired that image features can be intelligently analyzed based on a medical image by using the image recognition technologies, to help a doctor in diagnosis. In these scenarios, a damaged object needs to be recognized from a picture (vehicle damage picture or medical image). However, conventional techniques are not suitable to be used in practice. Therefore, it is desired to provide an improved solution to more accurately recognize a damaged object from a picture.

SUMMARY

One or more implementations of the present specification describe weak segmentation-based damage detection methods and apparatuses, where a weak segmentation damage detection model is trained based on automatically generated weak segmentation mark data, and a damage box and a damage segmentation outline predicted and output by the model can be used for mutual verification, thereby improving accuracy of damage prediction.

According to a first aspect, a computer-performed method for training a weak segmentation damage detection model is provided, and includes: obtaining a sample picture, where the sample picture has corresponding box mark data, the box mark data indicates at least one damage mark box, and each damage mark box is a minimum rectangular box that is marked by a marker and frames a damaged object in the sample picture; using each damage mark box as an outline of a corresponding damaged object, and marking a segmentation type for each pixel in the sample picture based on the outline, to generate segmentation mark data; inputting the sample picture to the weak segmentation damage detection model, where the weak segmentation damage detection model includes a box prediction branch and a segmentation prediction branch, the box prediction branch outputs box prediction data used to indicate a damage prediction box, and the segmentation prediction branch outputs segmentation prediction data obtained after the segmentation type of each pixel in the sample picture is predicted; determining a box prediction loss term based on a comparison between the box prediction data and the box mark data, and determining a segmentation prediction loss term based on a comparison between the segmentation prediction data and the segmentation mark data; determining a loss function for current prediction based on the box prediction loss term and the segmentation prediction loss term; and updating the weak segmentation damage detection model, to reduce the loss function.

In an implementation, a segmentation type is marked for each pixel by using the following method: marking a first segmentation type for a pixel located in the damage mark box, and marking a second segmentation type for a pixel located outside the damage mark box.

In an implementation, the at least one damage mark box includes a first damage mark box, and the box mark data further includes a first damage type that is in N predetermined damage types and is selected and marked by the marker for the first damage mark box; and in this case, the marking a segmentation type for each pixel includes: marking a segmentation type of a pixel located in the first damage mark box as a type corresponding to the first damage type.

In an implementation, the at least one damage mark box includes a first damage mark box and a second damage mark box, there is an overlapping region between the first damage mark box and the second damage mark box, the box mark data further includes a first damage type that is in N predetermined damage types and is selected and marked by the marker for the first damage mark box and a second damage type that is in the N predetermined damage types and is selected and marked by the marker for the second damage type, and the second damage type corresponds to higher damage severity than the first damage type; and in this case, the marking a segmentation type for each pixel includes: marking a segmentation type of a pixel located in the overlapping region as a type corresponding to the second damage type.

In an implementation, the weak segmentation damage detection model is implemented based on a convolutional neural network (CNN), the CNN includes a basic convolution layer, configured to perform convolution processing on the sample picture to obtain a corresponding convolutional feature map; the box prediction branch is used to predict the box prediction data based on the convolutional feature map; and the segmentation prediction branch is used to predict the segmentation prediction data based on the convolutional feature map.

Further, in an implementation, the segmentation prediction branch can include: an upsampling layer, configured to upsample a feature obtained after convolution processing into a first feature map that has the same size as the sample picture; and a prediction processing layer, configured to predict, based on the first feature map, a probability that each pixel belongs to each segmentation type.

In an implementation, the segmentation prediction data includes a probability that each pixel belongs to each segmentation type; and in this case, the segmentation prediction loss term can be determined as follows: A predicted segmentation type of each pixel is determined based on the probability that each pixel belongs to each segmentation type; and the predicted segmentation type of each pixel is compared with a marked segmentation type of the pixel, and the segmentation prediction loss term is determined based on a comparison result.

In another implementation, the segmentation prediction loss term can be determined as follows: A predicted probability that each pixel belongs to a marked segmentation type corresponding to the pixel is determined; and the segmentation prediction loss term is determined based on the predicted probability.

According to a second aspect, a computer-performed method for detecting damage from a picture is provided, and includes: obtaining a weak segmentation damage detection model trained by using the method according to the first aspect; inputting a to-be-examined picture to the weak segmentation damage detection model, where the weak segmentation damage detection model includes a box prediction branch and a segmentation prediction branch, the box prediction branch outputs box prediction data used to indicate at least one damage prediction box, and the segmentation prediction branch outputs segmentation prediction data obtained after a segmentation type of each pixel in the to-be-examined picture is predicted; and determining a damage detection result for the to-be-examined picture based on the box prediction data and the segmentation prediction data.

In a case, the box prediction data may not indicate a damage prediction box or the segmentation prediction data does not indicate a damaged object region, where the damaged object region is a connected region whose area is greater than a specific threshold and that is formed by a set of pixels whose predicted segmentation types are the same damage type. In this case, in an implementation, it can be determined that the damage detection result is that the to-be-examined picture includes no damaged object.

In another case, the box prediction data indicates at least one damage prediction box, and the segmentation prediction data indicates at least one damaged object region. In this case, the damage detection result for the to-be-examined picture can be determined based on the at least one damage prediction box and the at least one damaged object region.

In a specific implementation, the determining the damage detection result for the to-be-examined picture can include: using a union set of a region set corresponding to the at least one damage prediction box and a region set corresponding to the at least one damaged object region as the damage detection result.

In another implementation, the determining the damage detection result for the to-be-examined picture can include: removing any first damage prediction box in the at least one damage prediction box from the damage detection result if intersection-over-union between the first damage prediction box and each damaged object region is less than a predetermined threshold.

In still another implementation, the determining the damage detection result for the to-be-examined picture can include: removing any first damage prediction box in the at least one damage prediction box from the damage detection result if a proportion of an intersection area between the first damage prediction box and each damaged object region to a box area of the first damage prediction box is less than a predetermined threshold.

In an implementation, the at least one damage prediction box includes a first damage prediction box, the box prediction data further includes a first damage type predicted for the first damage prediction box, the at least one damaged object region includes a first damaged object region, and a pixel in the first damaged object region corresponds to a first segmentation type. In this case, the determining the damage detection result for the to-be-examined picture can include: determining the first damage prediction box as an abnormal prediction box or determining the first damaged object region as an abnormal region if intersection-over-union between the first damage prediction box and the first damaged object region is greater than a predetermined threshold, but the first damage type and the first segmentation type are not correlated.

According to a third aspect, an apparatus for training a weak segmentation damage detection model is provided, and includes: a sample acquisition unit, configured to obtain a sample picture, where the sample picture has corresponding box mark data, the box mark data indicates at least one damage mark box, and each damage mark box is a minimum rectangular box that is marked by a marker and frames a damaged object in the sample picture; a mark generation unit, configured to use each damage mark box as an outline of a corresponding damaged object, and mark a segmentation type for each pixel in the sample picture based on the outline, to generate segmentation mark data; a model input unit, configured to input the sample picture to the weak segmentation damage detection model, where the weak segmentation damage detection model includes a box prediction branch and a segmentation prediction branch, the box prediction branch outputs box prediction data used to indicate a damage prediction box, and the segmentation prediction branch outputs segmentation prediction data obtained after the segmentation type of each pixel in the sample picture is predicted; a first determining unit, configured to determine a box prediction loss term based on a comparison between the box prediction data and the box mark data, and determine a segmentation prediction loss term based on a comparison between the segmentation prediction data and the segmentation mark data; a second determining unit, configured to determine a loss function for current prediction based on the box prediction loss term and the segmentation prediction loss term; and a model update unit, configured to update the weak segmentation damage detection model, to reduce the loss function.

According to a fourth aspect, an apparatus for detecting damage from a picture is provided, and includes: a model acquisition unit, configured to obtain a weak segmentation damage detection model trained by using the apparatus in the third aspect; a model input unit, configured to input a to-be-examined picture to the weak segmentation damage detection model, where the weak segmentation damage detection model includes a box prediction branch and a segmentation prediction branch, the box prediction branch outputs box prediction data used to indicate at least one damage prediction box, and the segmentation prediction branch outputs segmentation prediction data obtained after a segmentation type of each pixel in the to-be-examined picture is predicted; and a result determining unit, configured to determine a damage detection result for the to-be-examined picture based on the box prediction data and the segmentation prediction data.

According to a fifth aspect, a computer readable storage medium is provided, where the computer readable storage medium stores a computer program, and when the computer program is executed in a computer, the computer is enabled to perform the methods in the first aspect and the second aspect.

According to a sixth aspect, a computing device is provided, and includes a memory and a processor, where the memory stores executable code, and when the processor executes the executable code, the methods in the first aspect and the second aspect are implemented.

According to the method and apparatus provided in the implementations of the present specification, the weak segmentation mark data is generated based on the damage box obtained through manual marking, the weak segmentation mark data is used to train the weak segmentation damage detection model that includes the box prediction branch and the segmentation prediction branch, and when in use, the to-be-examined picture is input to the weak segmentation damage detection model, to obtain the damage prediction box and the damaged object region by using the two branches. The damage prediction box and the damaged object region can be used for mutual verification and supplementation, thereby improving accuracy of damage detection.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

Figure 1:
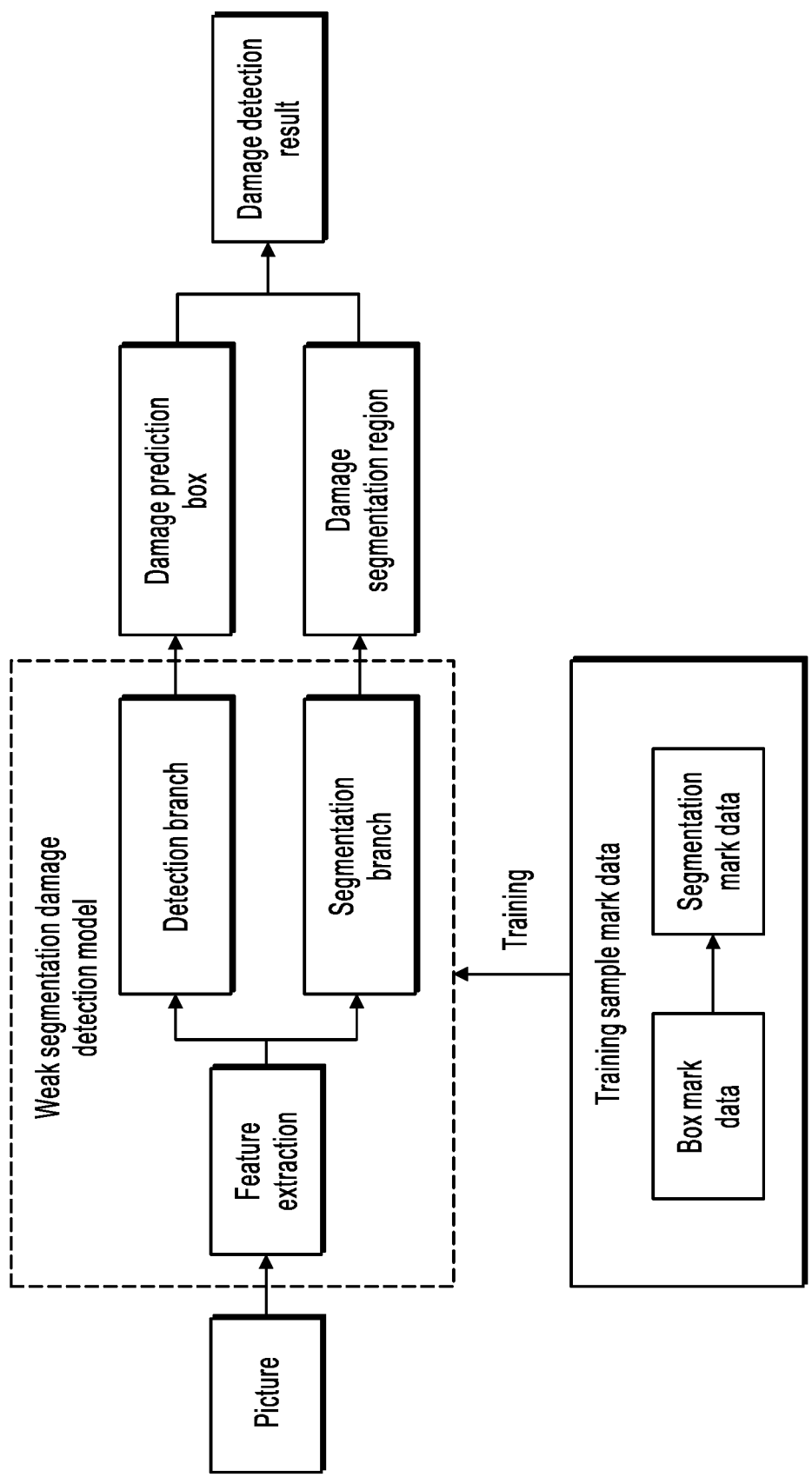
FIG. 1 is a schematic diagram illustrating an implementation scenario, according to an implementation.

The following describes the solutions provided in the present specification with reference to the accompanying drawings.

As described above, in a plurality of scenarios such as intelligent vehicle loss assessment and medical image analysis, a damaged object, for example, vehicle damage or an organ lesion, needs to be recognized from a picture. Therefore, a damage detection model that uses a damaged object as a detection target can be trained to perform damage recognition by using the damage detection model. A large amount of mark data is usually needed to train the model. For damage detection, a marker can mark a damaged object as a specific target object, that is, mark the damaged object in a picture by using a minimum rectangular box that includes the damaged object. Such a rectangular box is also referred to as a damage mark box. An original sample and the damage mark box jointly constitute a picture training sample. The damage detection model can be obtained by training the model by using such as training sample. After the damage detection model is obtained through training, damage recognition can be performed on a to-be-examined picture by using the damage detection model. An output result of the damage detection model is usually several damage prediction boxes predicted in the to-be-examined picture. Each damage prediction box frames a predicted damaged object by using a minimum rectangular box.

However, as described above, currently, detection accuracy of the damage detection model needs to be improved. Especially, in a vehicle damage recognition scenario, a vehicle damage picture is taken in a relatively complex environment, and is usually affected by factors such as reflection and stains. Consequently, accuracy of damage detection is not ideal. For example, reflection and stains are incorrectly detected as damage.

Therefore, the inventor proposes to perform image segmentation on a to-be-examined picture in addition to conventional damage detection, and verify or supplement a conventional damage detection result by using a segmentation result.

Image segmentation is also referred to as image semantic segmentation, and is used to segment or divide an image into regions that belong to/do not belong to a specific target object. An output of the image segmentation can be represented as a mask that covers a specific target object region. An image segmentation model is usually trained based on segmentation mark data for marking an outline of a target object. In a damage recognition scenario, the image segmentation is used to divide a picture into regions that belong to/do not belong to a damaged object. Correspondingly, it can be understood that the mark data for marking an outline of a damaged object is needed to train the model.

Marking of an outline usually requires the marker to draw a boundary of a target object by using several mark points.

This process is time-consuming and costly. Especially, it is very costly for poorly-defined target objects in an irregular shape.

In consideration of the previous factors, according to the implementations of the present disclosure, image segmentation training is performed by using a damage mark box as a mark for a general outline of a damaged object, to obtain a damage detection model that includes two branches, where one branch performs conventional damaged object detection, and the other branch performs image segmentation. Segmentation mark data is automatically generated by directly using the damage mark box as the outline of the damaged object, and has limited precision. Therefore, a model trained by using this method can be referred to as a weak segmentation damage detection model. The weak segmentation damage detection model can output a conventional damage prediction box and a weak segmentation result. The two results can be combined to optimize a final damage detection result.

FIG. 1 is a schematic diagram illustrating an implementation scenario, according to an implementation. As shown in FIG. 1, a training sample is used in advance to train a weak segmentation damage detection model. Specifically, the training sample includes a sample picture and mark data. The mark data for segmentation training is automatically generated by directly using a damage mark box as an outline of a damaged object. A damage detection model that includes two branches in FIG. 1 can be obtained through training by using such a training sample. One branch is a detection branch, and is used to perform conventional damage detection, and the other branch is a segmentation branch, and is used to perform image weak segmentation.

After the weak segmentation damage detection model is obtained through training, damage detection can be performed by using the model. As shown in FIG. 1, a to-be-examined picture can be input to the damage detection model. In the model, feature extraction is first performed on the to-be-examined picture, and then the detection branch outputs a damage prediction box for the to-be-examined picture, and the segmentation branch outputs a damage segmentation region for the to-be-examined picture. A final damage detection result can be obtained by combining analysis of the damage prediction box and the damage segmentation region.

The following describes a training process of the weak segmentation damage detection model and a prediction process of performing damage detection by using the model.

Figure 2:
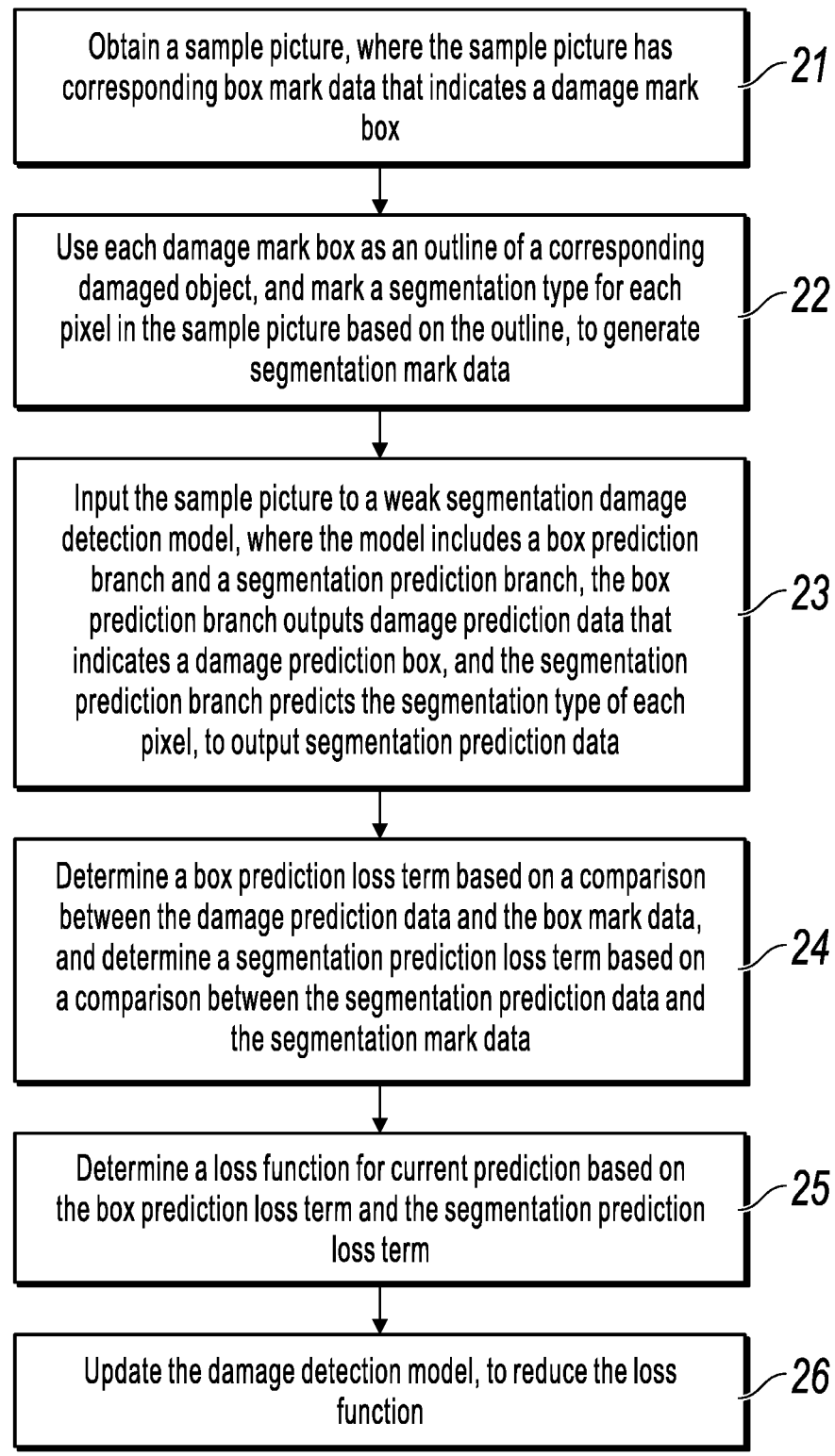
FIG. 2 is a flowchart illustrating a method for training a weak segmentation damage detection model, according to an implementation.

FIG. 2 is a flowchart illustrating a method for training a weak segmentation damage detection model, according to an implementation. It can be understood that the method can be performed by any apparatus, device, platform, or device cluster with computing and processing capabilities. As shown in FIG. 2, the training process includes at least the following steps: Step 21: Obtain a sample picture, where the sample picture has corresponding box mark data that indicates a damage mark box. Step 22: Use each damage mark box as an outline of a corresponding damaged object, and mark a segmentation type for each pixel in the sample picture based on the outline, to generate segmentation mark data. Step 23: Input the sample picture to the weak segmentation damage detection model, where the model includes a box prediction branch and a segmentation prediction branch, the box prediction branch outputs damage prediction data that indicates a damage prediction box, and the segmentation prediction branch predicts the segmentation type of each pixel, to output segmentation prediction data. Step 24: Determine a box prediction loss term based on a comparison between the damage prediction data and the box mark data, and determine a segmentation prediction loss term based on a comparison between the segmentation prediction data and the segmentation mark data. Step 25: Determine a loss function for current prediction based on the box prediction loss term and the segmentation prediction loss term. Step 26: Update the damage detection model, to reduce the loss function. The following describes specific implementations of the steps.

First, in step 21, the manually marked sample picture is obtained. The sample picture is usually a picture that includes a damaged object, for example, a picture of a damaged vehicle that is taken at a vehicle damage scene. Such a sample picture is marked by a marker, and has corresponding mark data. For marking of a damage detection task, the marker can frame a damaged object in the picture by using a minimum rectangular box that includes the damaged object. Such a minimum rectangular box is referred to as the damage mark box. Therefore, the data for manually marking the sample picture is also referred to as the box mark data that can indicate each damage mark box.

Figure 3:
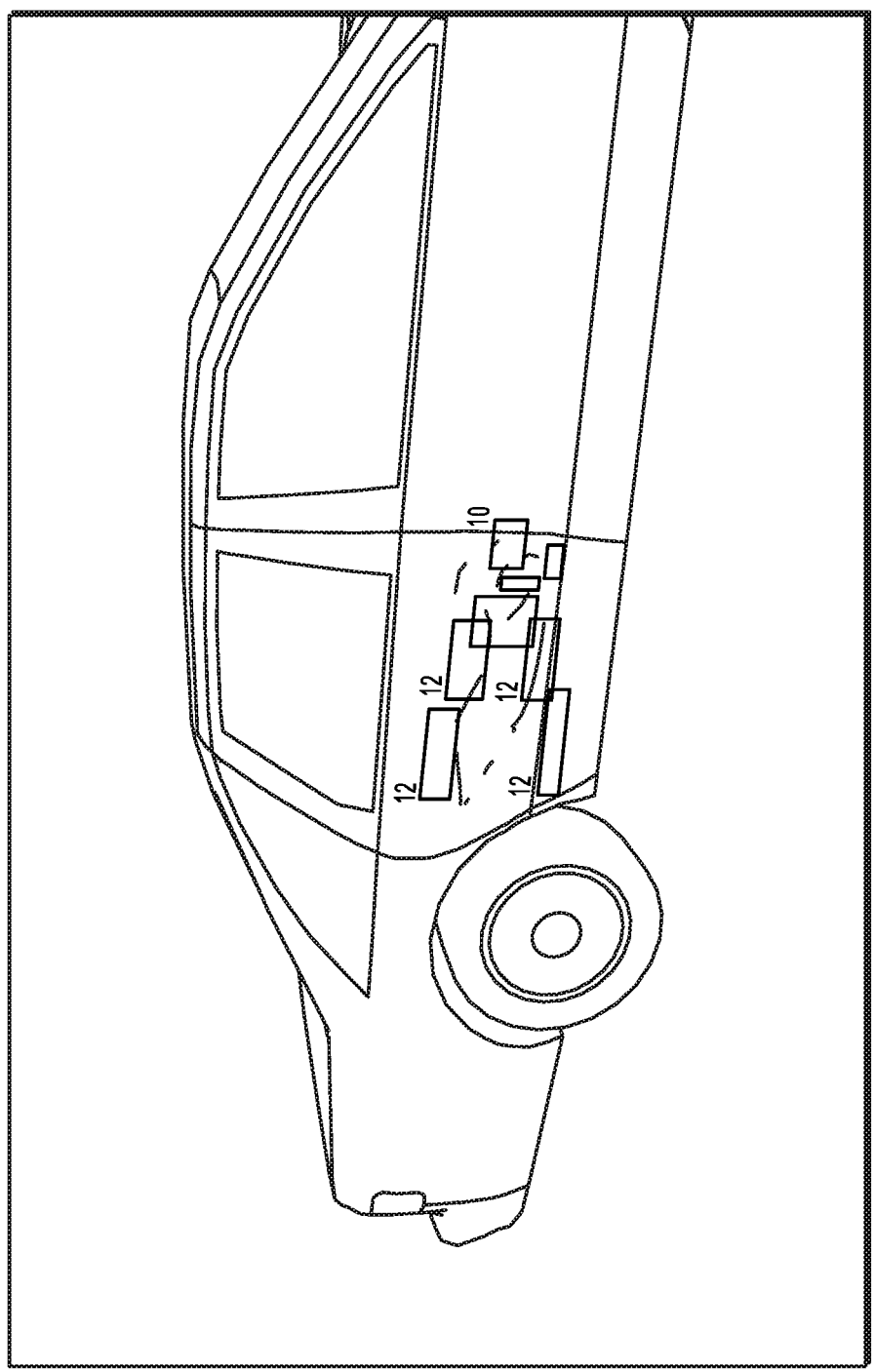
FIG. 3 illustrates a specific example of a manually marked sample picture.

FIG. 3 illustrates a specific example of a manually marked sample picture. In the example in FIG. 3, the sample picture is a picture of a damaged vehicle. After manual marking, the marker frames several damaged objects in the picture by using rectangular boxes, in other words, mark several damage mark boxes.

In an implementation, the marker can mark only a location of the damaged object, that is, frame the damaged object by using the damage mark box without distinguishing between damage types.

In another implementation, the marker can mark a type of each damaged object from N predetermined damage types. For example, for vehicle damage, N=10 damage types can be preset, for example, including scratch, deformation, crack, and (glass) break. In this case, in addition to the damage mark box, the marker can mark and select a type corresponding to the vehicle damage from the 10 damage types.

In FIG. 3, a number in the upper right corner of the damage mark box shows a damage type of a damaged object in the damage mark box. For example, 12 corresponds to scratch, and 10 corresponds to deformation. It can be understood that the damage type can be marked by using a plurality of methods. Different from the method in which different damage types are represented by using different numbers in FIG. 3, a method in which different damage types are represented by using mark boxes in different colors can be used. FIG. 3 is merely an example.

After the sample picture and the box mark data corresponding to the picture are obtained, in step 22, the segmentation mark data is automatically generated based on the box mark data.

As described above, the segmentation mark data is data for marking an outline of a target object to perform image segmentation training. In a conventional technology, the segmentation mark data is obtained based on the outline of the target object that is drawn by the marker by using several mark points. Typically, the segmentation mark data is a pixel-level mark, that is, whether each pixel in the picture belongs to a specific target object is marked.

To reduce marking costs, in step 22, each damage mark box is directly used as the outline of the corresponding damaged object, and the segmentation type is marked for each pixel in the sample picture based on the outline, to automatically generate the segmentation mark data.

More specifically, in an implementation, the damage mark box is used as an outline of a damaged object, and whether each pixel belongs to the damaged object is determined based on information whether the pixel falls within the damage mark box, to mark the segmentation type for the pixel. For example, a first segmentation type is marked for a pixel located in the damage mark box, and a second segmentation type is marked for a pixel located outside the damage mark box. In this method, pixels in the sample picture are classified into two types: a foreground part that belongs to the damaged object (corresponding to the first segmentation type) and a background part that does not belong to the damaged object (corresponding to the second segmentation type).

In an implementation, as described above, the box mark data further includes a damage type marked by the marker for each damage mark box, for example, a damage type 12 corresponding to scratch in FIG. 3 and a damage type 10 corresponding to deformation. In this case, in an implementation, a segmentation type is marked for a pixel based on a damage type of a damage mark box that the pixel falls within. Specifically, for ease of description, any damage mark box is referred to as a first damage mark box. Assume that a first damage type is marked for the first damage mark box. Therefore, in step 22, a segmentation type of a pixel that falls within the first damage mark box is marked as a type corresponding to the first damage type.

In this case, if N damage types are preset, pixels can be classified into N+1 segmentation types during segmentation marking. The first N segmentation types are in a one-to-one mapping relationship with the N damage types, and the other one segmentation type corresponds to a case in which a pixel does not belong to any damage mark box. More specifically, for vehicle damage, if 10 damage types are preset for the damaged object, when a segmentation type is marked for a pixel, the segmentation type can be marked for the pixel based on a type that is in the 10 damage types and is of a damage mark box that the pixel falls within. If the pixel does not fall within any damage mark box, the segmentation type of the pixel is marked as an eleventh type.

In an implementation, damage mark boxes overlap. In this case, a segmentation type can be marked for a pixel that falls within an overlapping region between a plurality of damage mark boxes based on ranks of severity of damage types corresponding to the plurality of damage mark boxes.

Usually, if N damage types are set, ranks of damage severity corresponding to the damage types can be further preset. For example, in the case of vehicle damage, it can be set that severity of damage types is ranked in ascending order, including scratch<deformation<crack. In an implementation, when a pixel falls within an overlapping region between a plurality of damage mark boxes, a damage type with the higher damage severity can be determined from damage types corresponding to the plurality of damage mark boxes based on ranks of severity of the damage types, and a type corresponding to the damage type is used as a segmentation type of the pixel.

Figure 4:
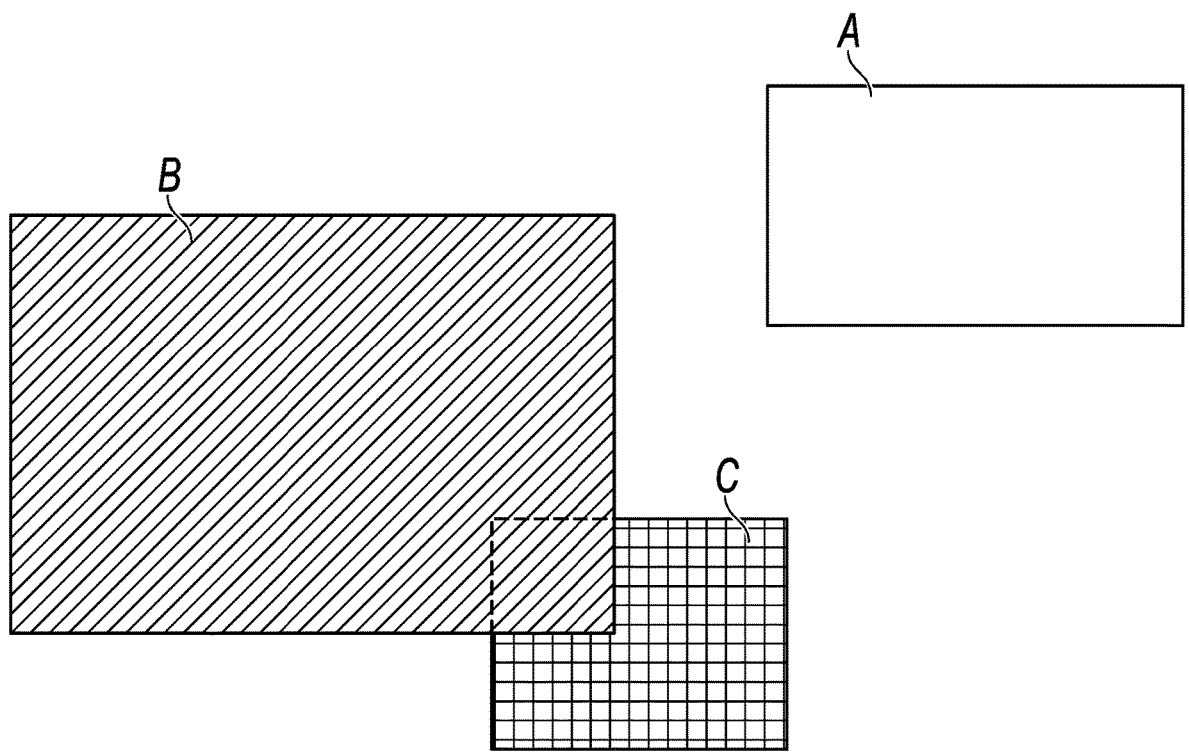
FIG. 4 is a schematic diagram illustrating marking a segmentation type for a pixel, according to an implementation.

FIG. 4 is a schematic diagram illustrating marking a segmentation type for a pixel, according to an implementation. FIG. 4 shows three damage mark boxes A, B, and C, which are respectively marked with damage types a, b, and c. A segmentation type of each pixel (a pixel in a shaded region) included in the damage mark box A can be marked as a type corresponding to the damage type a.

There is an overlapping region between the damage mark boxes B and C. Assume that the damage type b corresponds to higher severity than the damage type c. In this case, a type corresponding to the damage type b can be marked for a pixel in the overlapping region. Types corresponding to the damage types b and c are marked for pixels located outside the overlapping region between the damage mark boxes B and C. In this case, the type b is marked for a pixel in an oblique line region, and the type c is marked for a pixel in a square region.

A segmentation type of another pixel that does not fall within any damage mark box can be marked as a type 0.

As such, in the previous method, the damage mark box is used as the outline of the corresponding damaged object, and the segmentation type is marked for each pixel, to automatically generate the segmentation mark data.

It can be understood that the damage mark box is a minimum rectangular box that frames the damaged object, and is usually not equal to a real outline of the damaged object. The damage mark box is used as the outline of the damaged object to perform segmentation marking, which is merely rough approximation marking. Therefore, the mark data can also be referred to as weak segmentation mark data. Such weak segmentation mark data can be used to train the weak segmentation damage detection model.

Referring back to FIG. 2, in step 23, the sample picture is input to the weak segmentation damage detection model, and the weak segmentation damage detection model predicts the damaged object in the sample picture. It should be understood that the weak segmentation damage detection model here can be an initial model, or can be a model that needs to be further updated in the training process. Specifically, the weak segmentation damage detection model includes two branches: the box prediction branch and the segmentation prediction branch. The box prediction branch outputs the damage prediction box predicted for the sample picture, and the segmentation prediction branch predicts the segmentation type of each pixel to generate the segmentation prediction data.

The weak segmentation damage detection model can be implemented based on various algorithms and model structures. Typically, the weak segmentation damage detection model can be implemented based on a convolutional neural network (CNN).

Figure 5:
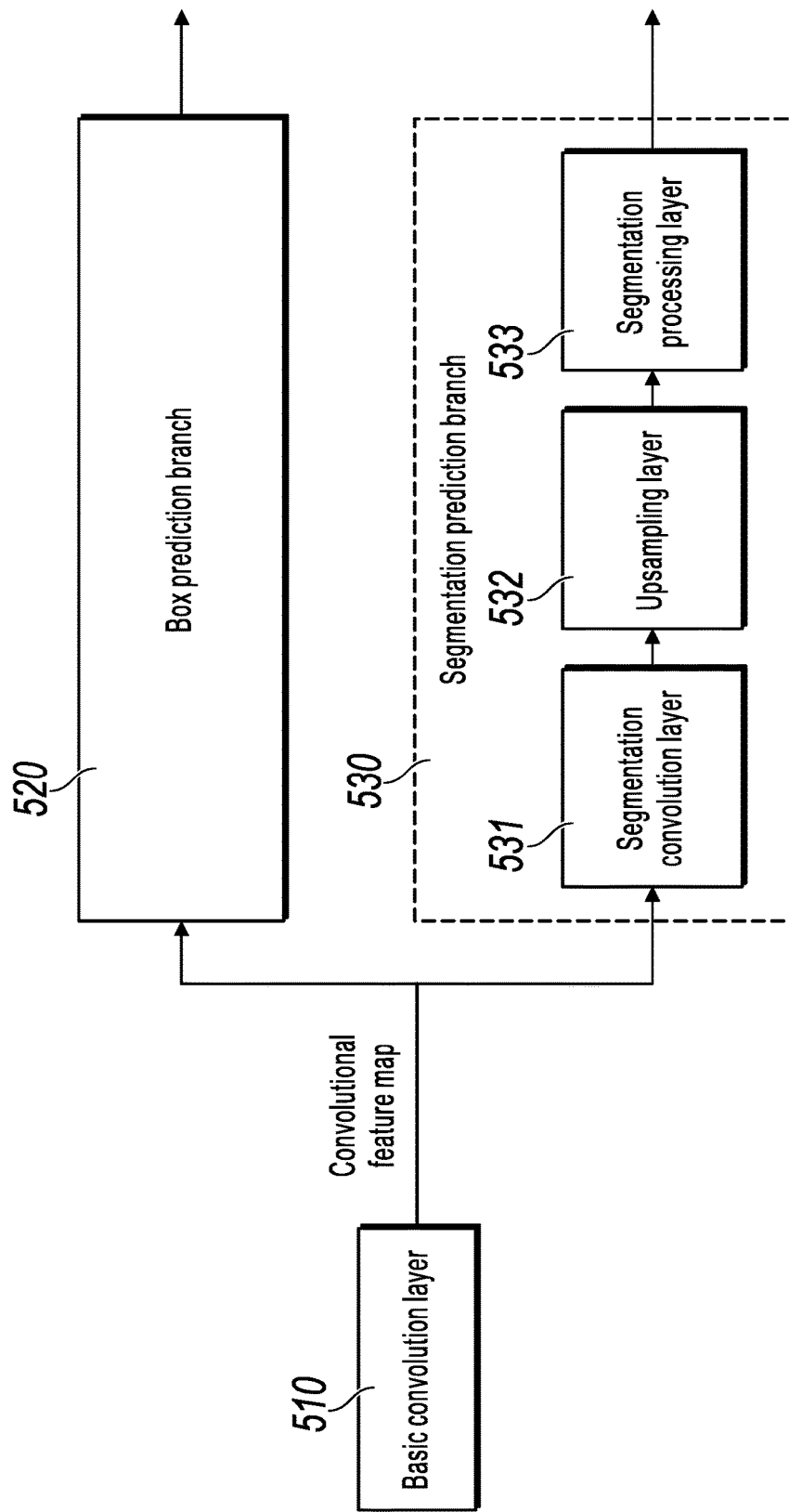
FIG. 5 is a schematic structural diagram of a weak segmentation damage detection model, according to an implementation.

FIG. 5 is a schematic structural diagram of a weak segmentation damage detection model, according to an implementation. In the example, the weak segmentation damage detection model is implemented as a convolutional neural network (CNN). As shown in FIG. 5, the neural network includes a basic convolution layer 510, a box prediction branch 520, and a segmentation prediction branch 530.

The basic convolution layer 510 is configured to perform convolution processing on the input sample picture to obtain a convolutional feature map. The basic convolution layer 510 usually can include a plurality of sublayers, and convolution processing is performed at each sublayer by using a corresponding convolutional check picture. After the convolution processing at the sublayer, optionally, pooling processing can be further performed. The convolution processing and pooling processing are performed for a plurality of times, so that the obtained feature map can reflect more abstract and higher-order features in the original sample picture. Usually, based on a size of a convolution kernel and the quantity of times convolution processing is performed, the feature map obtained after convolution processing is smaller than the original sample picture in dimension.

The box prediction branch 520 performs box prediction based on the convolutional feature map, and outputs the box prediction data. The box prediction data indicates the predicted damage prediction box. When the training data further includes the damage type marked for each damage mark box, the box prediction branch further predicts the damage type corresponding to each damage prediction box. The box prediction branch can be implemented by using various known target detection algorithms, or in terms of structure, can be implemented by using various known neural network structures used to perform target detection. For example, the box prediction branch can further include a convolution processing layer, a box regression layer, and a fully connected processing layer.

The segmentation prediction branch 530 predicts the segmentation type of the pixel based on the convolutional feature map, to obtain the segmentation prediction data.

Specifically, the segmentation prediction branch 530 can include a segmentation convolution layer 531, configured to perform further convolution processing on the convolutional feature map. A convolution kernel in the segmentation convolution layer 531 can be designed for features of segmentation prediction, and is different from a convolution kernel in the basic convolution layer. Therefore, features obtained after further convolution processing is performed are more favorable to subsequent segmentation prediction processing. However, it should be understood that the convolution layer 531 is an optional network processing layer, and the network processing layer can be omitted in some cases.

The segmentation prediction branch 530 further includes an upsampling layer 532, configured to upsample a feature obtained after convolution processing into a first feature map that has the same size as the sample picture. As described above, the feature map obtained after convolution processing is smaller than the original sample picture in dimension. Therefore, in the segmentation prediction branch, a feature map that has the same size as the original picture is restored by using the upsampling layer. Specifically, the upsampling layer 532 can restore, by using an upsampling method such as interpolation processing, the feature with a small dimension obtained after convolution processing into the first feature map that is the same as the original sample picture in dimension. Therefore, each pixel in the first feature map corresponds to each pixel in the original sample picture.

Then, the segmentation processing layer 533 predicts a probability that each pixel in the first feature map belongs to each segmentation type. The pixels in the first feature map respectively correspond to the pixels in the original sample picture. Therefore, that the segmentation processing layer 533 predicts a segmentation type of the pixel in the first feature map is equivalent to predicting a probability that each pixel in the sample picture belongs to each segmentation type.

Specifically, in a case of two classifications, the segmentation processing layer 533 can predict a probability that each pixel belongs to the damaged object (corresponding to a first segmentation type). In an implementation, it can be determined that a pixel whose probability value is greater than a predetermined threshold belongs to the damaged object.

In a case of a plurality of classifications, for example, when there are N+1 segmentation types, the segmentation processing layer 533 can predict a probability $P_{ij}$ that each pixel i belongs to the jth segmentation type in the N+1 segmentation types. Therefore, a vector $(P_{i0}, P_{i1}, P_{i2}, \ldots, P_{iN})$ of probabilities that each pixel i belongs to all the segmentation types can be formed. Alternatively, a set of probabilities that all the pixels belong to each segmentation type j can be formed. The pixels in the picture are usually arranged in a matrix form, and therefore the probability set for each segmentation type j can be formed as a probability matrix corresponding to the pixels.

The segmentation prediction branch 530 can at least output, by using the upsampling layer 532 and the segmentation processing layer 533, the segmentation prediction data obtained after the segmentation type of each pixel is predicted. In an implementation, the segmentation prediction data is the probability that the pixel belongs to each segmentation type and is predicted by the segmentation processing layer 533. In another implementation, the segmentation prediction branch can determine a predicted segmentation type of each pixel based on the probability, and use the segmentation type as the segmentation prediction data. For example, a segmentation type with the highest predicted probability is used as the predicted segmentation type of each pixel.

Therefore, the box prediction data and the segmentation prediction data are obtained by using the weak segmentation damage detection model shown in FIG. 5.

It is worthwhile to note that the segmentation mark data used for segmentation training is automatically generated based on the damage mark box, and therefore is different from conventional segmentation mark data. In addition, a model structure of the weak segmentation damage detection model is also different from that of a conventional damage detection model. The conventional damage detection model does not include a segmentation branch, and therefore is not used for image segmentation. A conventional image segmentation model does not include a box prediction branch, and therefore is not used for box prediction. Although there are some neural network models that are used to perform both box prediction and image segmentation, for example, Mask-RCNN, such models are usually divided into two branches after alternative damage boxes are selected. One branch performs further regression and type prediction on the alternative damage box, and the other branch performs image segmentation based on the alternative damage box, that is, image segmentation is performed in the alternative damage box. In other words, in models such as Mask-RCNN, image segmentation is performed based on box prediction, and is not a branch independent of the box prediction branch.

In the weak segmentation damage detection model shown in FIG. 5, after basic convolution processing is performed by using the basic convolution layer, the model is divided into two independent branches. The box prediction branch and the segmentation prediction branch perform further processing and prediction based on the feature map obtained after convolution processing, and the prediction processes are independent of each other. The two branches perform prediction independently, so that prediction results output by the two branches are more favorable to mutual verification.

In practice, the weak segmentation damage detection model can be obtained through modification based on a plurality of specific CNN network structures. For example, a recurrent fully convolutional network (RFCN) can be used as a basic network structure, and the segmentation prediction branch is added after the feature map and before position-sensitive convolution.

In this method, the weak segmentation damage detection model that includes two branches is implemented by using a plurality of specific neural network structures. In the model, the box prediction branch generates the box prediction data related to the damage prediction box, and the segmentation prediction branch generates the segmentation prediction data related to the segmentation type of each pixel.

To train such a model, next, the prediction data needs to be compared with the corresponding mark data, to obtain a value of the loss function for the current prediction, which serves as a basis for update and adjustment of a parameter in the model.

Specifically, referring back to FIG. 2, in step 24, the box prediction loss term is determined based on the comparison between the box prediction data and the box mark data. In an implementation, the box prediction data indicates a location of each predicted damage prediction box. The box prediction loss term can be determined by comparing a location difference between the damage prediction box and the damage mark box. In an implementation, the box prediction data further indicates a predicted damage type corresponding to each damage prediction box. In this case, based on the location difference, a predicted damage type of the damage prediction box is further compared with a marked damage type of the corresponding damage mark box, and the box prediction loss term is determined based on the comparison between types. In mathematics, the box prediction loss term can be determined by using various conventional algorithms. For example, an L2 error form is used as the box prediction loss term.

In step 24, the segmentation prediction loss term is further determined based on the comparison between the segmentation prediction data and the segmentation mark data.

In an implementation, the segmentation prediction loss term is determined based on a comparison between segmentation types. Specifically, in an implementation, the segmentation prediction branch outputs the probability that each pixel belongs to each segmentation type as the segmentation prediction data. In this case, the predicted segmentation type of each pixel can be determined based on the probability. For example, a segmentation type with the highest probability is used as the predicted segmentation type corresponding to the pixel. In another implementation, the segmentation prediction branch directly outputs the predicted segmentation type of each pixel. In this case, the predicted segmentation type can be directly obtained from the segmentation prediction data. Then, the predicted segmentation type of each pixel is compared with a marked segmentation type of the pixel, and pixels whose predicted segmentation types are consistent with marked segmentation types are counted, in other words, the quantity of pixels for which prediction is correct or a proportion of the quantity to the total quantity of pixels is obtained. The segmentation prediction loss term is determined based on the quantity or the proportion, and a larger quantity or a larger proportion indicates a smaller segmentation prediction loss term.

In another implementation, the segmentation prediction loss term is determined based on the probability that each pixel belongs to each segmentation type in the segmentation prediction data and a marked segmentation type of each pixel. Specifically, the vector $(P_{i0}, P_{i1}, P_{i2}, \ldots, P_{iN})$ of probabilities that each pixel i belongs to all the segmentation types can be obtained from the segmentation prediction data. In addition, the marked segmentation type k of the pixel i is obtained. Therefore, a segmentation loss term corresponding to the pixel i can be determined as:

$$L_i = \sum_{j \neq k} P_{ij}^2 + (1 - P_{ik})^2,$$

where
$P_{ij}$ represents the probability that the pixel i belongs to the segmentation type j, and the segmentation type k is a marked segmentation type. Then, segmentation loss terms of all the pixels i can be added to obtain the segmentation loss term for the current prediction.

In another implementation, by using a softmax function based on the predicted probability that each pixel belongs to each segmentation type and a marked segmentation type of the pixel, the segmentation loss term L can be determined as:

$$p = softmax(pred)$$
$$L = -\sum_i \sum_j \text{label}_j \log p_{ij}.$$

In still another implementation, the segmentation prediction loss term is determined based on the predicted probability that each pixel corresponds to a marked segmentation type. Specifically, a marked segmentation type k of any pixel i is obtained from the segmentation mark data. In addition, the vector $(P_{i0}, P_{i1}, P_{i2}, \ldots P_{iN})$ of probabilities that the pixel i belongs to all the segmentation types is obtained from the segmentation prediction data, and the predicted probability $P_{ik}$ corresponding to the marked segmentation type k is extracted from the vector. The segmentation prediction loss term can be determined based on the predicted probability that each pixel corresponds to the marked segmentation type. In an example, the segmentation prediction loss term can be expressed as:

$$L = \sum_i (1 - P_i)^2,$$

where
Pi represents the predicted probability that the pixel i belongs to the marked segmentation type of the pixel i.

In another implementation, the segmentation prediction loss term can be determined based on the probability that each pixel belongs to each segmentation type by using another function form, cross entropy, etc.

Next, in step 25, the loss function for the current prediction is determined based on the box prediction loss term and the segmentation prediction loss term determined in step 24. In an implementation, the sum of the box prediction loss term and the segmentation prediction loss term can be determined as the loss function for the current prediction. In another implementation, weighted summation can be performed on the box prediction loss term and the segmentation prediction loss term, to obtain the loss function for the current prediction.

Then, in step 26, the weak segmentation damage detection model is updated, to reduce the loss function. In other words, model parameters of the weak segmentation damage detection model are adjusted, to constantly reduce the loss function. The parameter adjustment process can be performed by using conventional methods such as back propagation and gradient descent.

In the previous process, the model parameters are constantly updated until a predetermined convergence condition is satisfied, or a model test result satisfies a specific accuracy condition. In this case, training of the model is completed, and the trained weak segmentation damage detection model is obtained. The model is trained based on the automatically generated weak segmentation mark data, and achieves strong prediction of the damage box and weak prediction of the damage outline by using the two independent branches.

The following describes a process of performing damage prediction by using the trained weak segmentation damage detection model.

Figure 6:
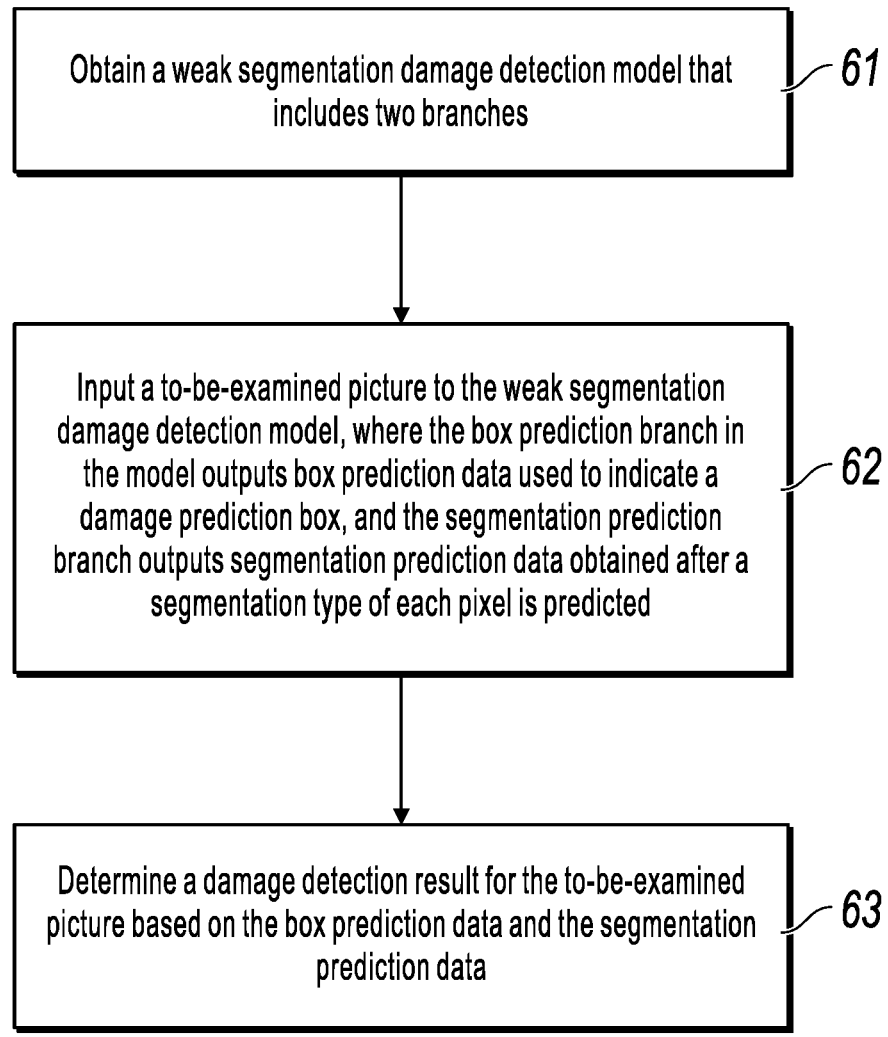
FIG. 6 is a flowchart illustrating steps of a method for recognizing damage from a picture, according to an implementation.

FIG. 6 is a flowchart illustrating steps of a method for recognizing damage from a picture, according to an implementation. As shown in FIG. 6, the process includes the following steps.

In step 61, a weak segmentation damage detection model trained by using the method in FIG. 2 is obtained. The model includes a box prediction branch and a segmentation prediction branch. The weak segmentation damage detection model has, for example, the structure shown in FIG. 5.

In step 62, a to-be-examined picture is input to the weak segmentation damage detection model. Therefore, the box prediction branch in the model outputs box prediction data used to indicate a damage prediction box, and the segmentation prediction branch outputs segmentation prediction data obtained after a segmentation type of each pixel in the to-be-examined picture is predicted. A process of outputting the box prediction data and the segmentation prediction data by using the two branches is similar to that in step 23 in the previous training process, and is omitted here for simplicity.

Next, in step 63, a damage detection result for the to-be-examined picture is determined based on the box prediction data and the segmentation prediction data.

Therefore, in an implementation, a damaged object region, namely, a connected region whose area is greater than a specific threshold and that is formed by a set of pixels whose predicted segmentation types are the same damage type, is first determined based on the segmentation prediction data.

Specifically, in an example, the segmentation prediction data includes a predicted segmentation type corresponding to each pixel in the to-be-examined picture. In another example, the segmentation prediction data includes a probability that each pixel in the to-be-examined picture belongs to each segmentation type. In this case, the predicted segmentation type of each pixel can be determined based on the probability.

The damaged object region can be obtained based on the predicted segmentation type of each pixel. Specifically, a set of pixels whose predicted segmentation types are the same damage type can be first obtained, and whether the set forms a connected region and whether an area of the connected region is greater than the specific threshold can be determined. If the set of pixels with the same damage type can form a connected region whose area is greater than the specific threshold, the connected region is used as a damaged object region.

In a case, the box prediction data indicates at least one damage prediction box, but the damaged object region cannot be obtained from the segmentation prediction data. Alternatively, at least one damaged object region is obtained from the segmentation prediction data, but the box prediction data does not indicate a damage prediction box. In an implementation, in the previous two cases, in step 63, it is determined that the to-be-examined picture includes no damaged object.

In another case, the box prediction data indicates at least one damage prediction box, and at least one damaged object region is obtained from the segmentation prediction data. In this case, in step 63, the damage detection result for the to-be-examined picture is determined based on the at least one damage prediction box and the at least one damaged object region.

In an implementation, a union set of a region set corresponding to the at least one damage prediction box and a region set corresponding to the at least one damaged object region is used as the damage detection result. The damage detection result obtained in this method comprehensively includes possible damage, and detection omission can be avoided to the largest extent.

In an implementation, an abnormal damage prediction box is removed from the damage detection result based on overlapping between the damage prediction box and the damaged object region. The following provides description by using an example in which any damage prediction box is referred to as a first damage prediction box.

In an implementation, intersection-over-union (IoU), namely, a ratio of an intersection area to a union area, between the first damage prediction box and each damaged object region can be calculated. If each calculated IoU is less than a predetermined threshold, it indicates that the first damage prediction box slightly overlaps each damaged object region. In other words, there is no damaged object region that can be used to verify the first damage prediction box. Therefore, the first damage prediction box is removed from the damage detection result.

In another implementation, a proportion of an intersection area between the first damage prediction box and each damaged object region to a box area of the first damage prediction box is calculated. If the calculated proportion is less than a predetermined threshold, the first damage prediction box is removed from the damage detection result.

In an implementation, a size of an overlapping region between the damage prediction box and the damaged object region is verified, and types are also verified. In such an implementation, the box prediction data needs to further include a damage type predicted for each damage prediction box. Assume that the first damage prediction box corresponds to a predicted first damage type in the box prediction data. In addition, assume that each pixel in any first damaged object region in the at least one damaged object region corresponds to a first segmentation type.

In an implementation, IoU between the first damage prediction box and the first damaged object region is first determined. If the IoU is greater than a predetermined threshold, that is, an overlapping rate of the first damage prediction box and the first damaged object region is large enough, whether the first damage type and the first segmentation type are correlated is determined. If the first damage type and the first segmentation type are correlated, the first damage prediction box and the first damaged object region can be used for mutual verification. If the first damage type and the first segmentation type are not correlated, for example, the first damage type indicates scratch and the first segmentation type indicates glass break, it indicates that at least one of the first damage prediction box and the first damaged object region is abnormal. In this case, the first damage prediction box can be determined as an abnormal prediction box, or the first damaged object region can be determined as an abnormal region for further detection and confirmation. As such, an abnormal result obtained due to false detection is further removed from the damage detection result.

Figure 7:
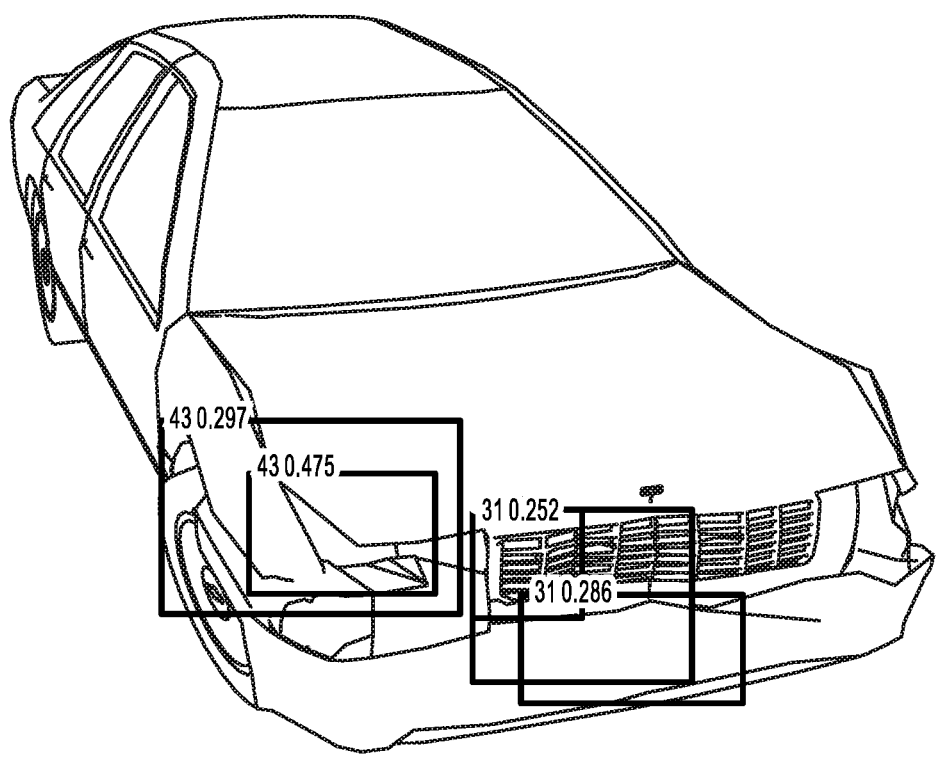
FIG. 7 illustrates a damage prediction box and a damaged object region output by a weak segmentation damage detection model in an example.

FIG. 7 illustrates a damage prediction box and a damaged object region output by a weak segmentation damage detection model in an example. In the example in FIG. 7, a to-be-examined picture is a vehicle damage picture. A plurality of damage prediction boxes are predicted in the to-be-examined picture, and two numbers marked in the upper left corner of each damage prediction box respectively show a predicted damage type and a prediction confidence level. A damaged object region is generated based on a predicted segmentation type of each pixel, and is shown by using a mask. In practice, when there are a plurality of damage types, damaged object regions corresponding to different segmentation types can be shown by using masks in different colors. The damage prediction box and the damaged object region shown in FIG. 7 can be comprehensively analyzed by using the previous various methods, to obtain a damage detection result.

In the previous process, the weak segmentation damage detection model that includes two branches is obtained through training by using the box mark data obtained through manual marking and the automatically generated weak segmentation mark data. The box prediction branch and the segmentation prediction branch respectively and independently perform box prediction and segmentation prediction. The segmentation mark data is a weak mark, and therefore has low precision. Corresponding, a prediction result of the segmentation prediction branch is usually not accurate, and cannot be used as an independent outline result of a damaged object. However, the weak segmentation prediction result can be used in combination with a box prediction result, and is used with the damage prediction box for mutual verification to find detection omission and false detection, to optimize and improve a damage detection result and improve detection accuracy.

Figure 8:
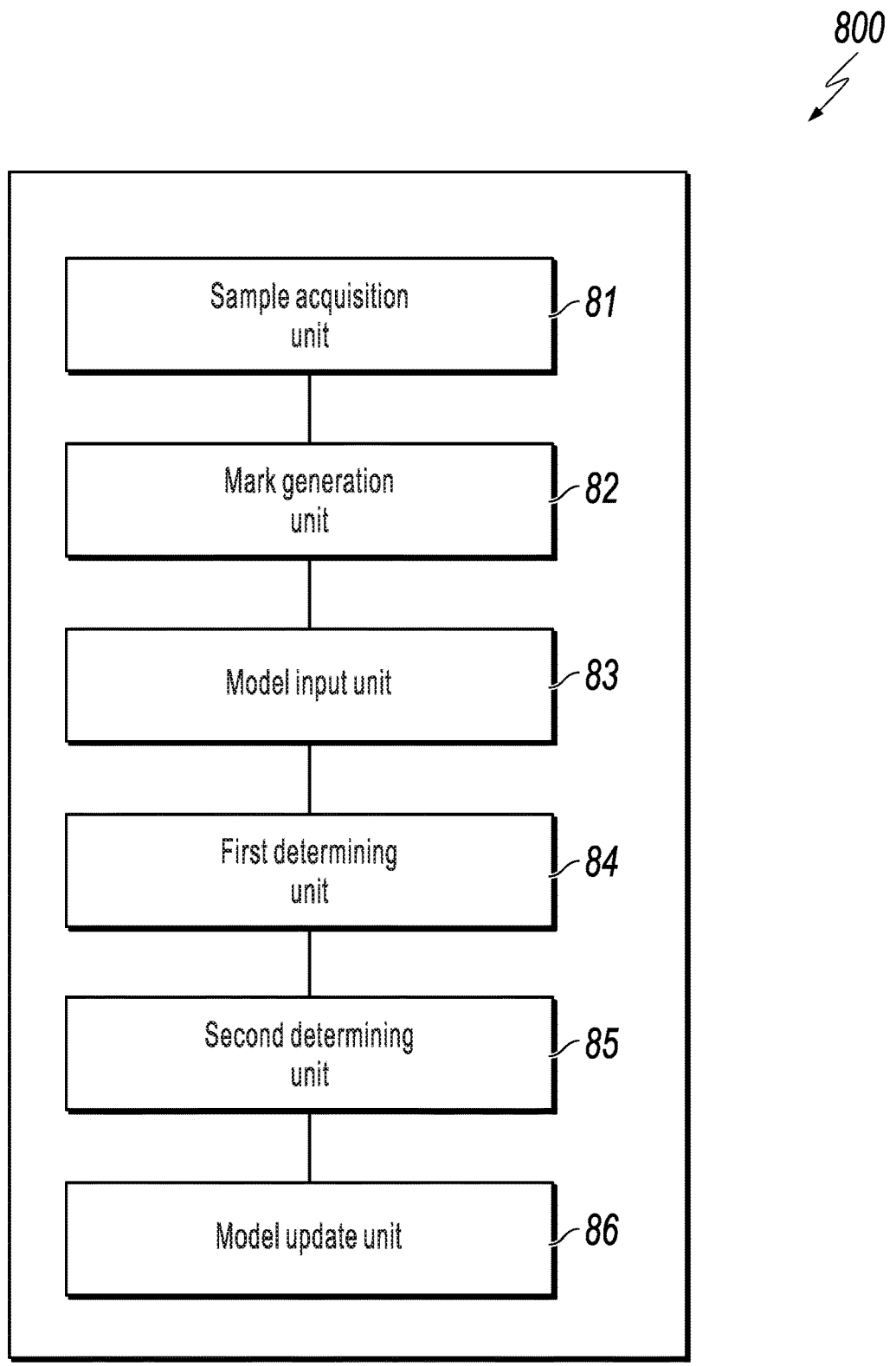
FIG. 8 is a schematic block diagram illustrating an apparatus for training a weak segmentation damage detection model, according to an implementation.

According to an implementation of another aspect, an apparatus for training a weak segmentation damage detection model is provided. The apparatus can be deployed in any device, platform, or device cluster with computing and processing capabilities. FIG. 8 is a schematic block diagram illustrating an apparatus for training a weak segmentation damage detection model, according to an implementation. As shown in FIG. 8, the training apparatus 800 includes: a sample acquisition unit 81, configured to obtain a sample picture, where the sample picture has corresponding box mark data, the box mark data indicates at least one damage mark box, and each damage mark box is a minimum rectangular box that is marked by a marker and frames a damaged object in the sample picture; a mark generation unit 82, configured to use each damage mark box as an outline of a corresponding damaged object, and mark a segmentation type for each pixel in the sample picture based on the outline, to generate segmentation mark data; a model input unit 83, configured to input the sample picture to the weak segmentation damage detection model, where the weak segmentation damage detection model includes a box prediction branch and a segmentation prediction branch, the box prediction branch outputs box prediction data used to indicate a damage prediction box, and the segmentation prediction branch outputs segmentation prediction data obtained after the segmentation type of each pixel in the sample picture is predicted; a first determining unit 84, configured to determine a box prediction loss term based on a comparison between the box prediction data and the box mark data, and determine a segmentation prediction loss term based on a comparison between the segmentation prediction data and the segmentation mark data; a second determining unit 85, configured to determine a loss function for current prediction based on the box prediction loss term and the segmentation prediction loss term; and a model update unit 86, configured to update the weak segmentation damage detection model, to reduce the loss function.

In an implementation, the mark generation unit 82 is configured to: mark a first segmentation type for a pixel located in the damage mark box, and mark a second segmentation type for a pixel located outside the damage mark box.

In an implementation, the at least one damage mark box includes a first damage mark box, and the box mark data further includes a first damage type that is in N predetermined damage types and is selected and marked by the marker for the first damage mark box. In this case, the mark generation unit 82 can be configured to mark a segmentation type of a pixel located in the first damage mark box as a type corresponding to the first damage type.

In an implementation, the at least one damage mark box includes a first damage mark box and a second damage mark box, there is an overlapping region between the first damage mark box and the second damage mark box, the box mark data further includes a first damage type that is in N predetermined damage types and is selected and marked by the marker for the first damage mark box and a second damage type that is in the N predetermined damage types and is selected and marked by the marker for the second damage type, and the second damage type corresponds to higher damage severity than the first damage type. In this case, the mark generation unit 82 can be configured to mark a segmentation type of a pixel located in the overlapping region as a type corresponding to the second damage type.

In an implementation, the weak segmentation damage detection model can be implemented based on a convolutional neural network (CNN), the CNN includes a basic convolution layer, configured to perform convolution processing on the sample picture to obtain a corresponding convolutional feature map. Correspondingly, the box prediction branch can predict the box prediction data based on the convolutional feature map, and the segmentation prediction branch can predict the segmentation prediction data based on the convolutional feature map.

Further, in an implementation, the segmentation prediction branch can include: an upsampling layer, configured to upsample a feature obtained after convolution processing into a first feature map that has the same size as the sample picture; and a prediction processing layer, configured to predict, based on the first feature map, a probability that each pixel belongs to each segmentation type.

In an implementation, the segmentation prediction data includes a probability that each pixel belongs to each segmentation type, and the first determining unit 84 is configured to: determine a predicted segmentation type of each pixel based on the probability that each pixel belongs to each segmentation type; and compare the predicted segmentation type of each pixel with a marked segmentation type of the pixel, and determine the segmentation prediction loss term based on a comparison result.

In another implementation, the first determining unit 84 is configured to: determine a predicted probability that each pixel belongs to a marked segmentation type corresponding to the pixel; and determine the segmentation prediction loss term based on the predicted probability.

Figure 9:
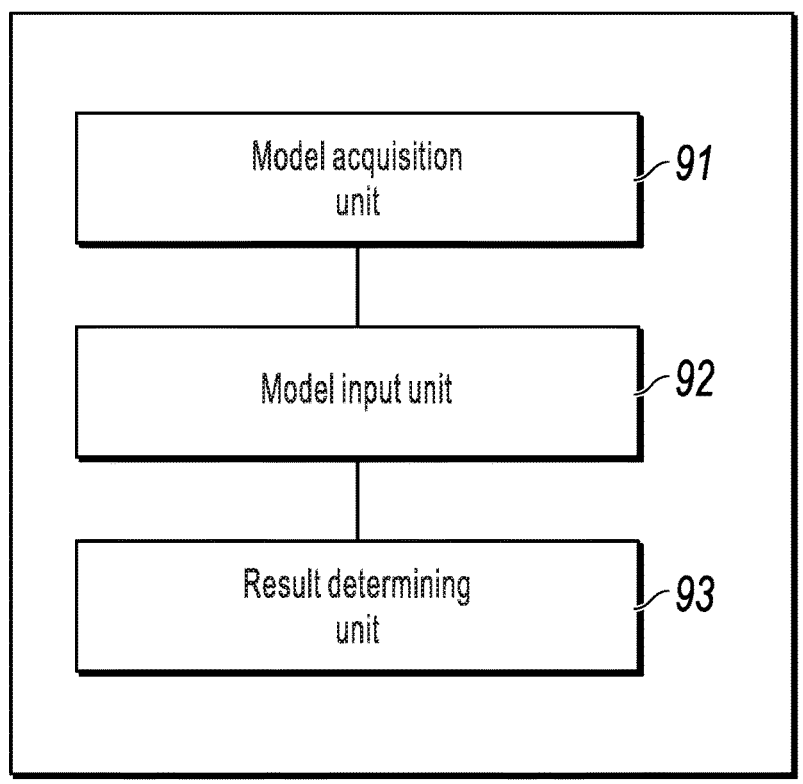
FIG. 9 is a schematic block diagram illustrating a damage detection apparatus, according to an implementation.

According to an implementation of another aspect, an apparatus for detecting damage from a picture is provided. The apparatus can be deployed in any device, platform, or device cluster with computing and processing capabilities. FIG. 9 is a schematic block diagram illustrating a damage detection apparatus, according to an implementation. As shown in FIG. 9, the detection apparatus 900 includes: a model acquisition unit 91, configured to obtain a weak segmentation damage detection model trained by using the apparatus in FIG. 8; a model input unit 92, configured to input a to-be-examined picture to the weak segmentation damage detection model, where the weak segmentation damage detection model includes a box prediction branch and a segmentation prediction branch, the box prediction branch outputs box prediction data used to indicate at least one damage prediction box, and the segmentation prediction branch outputs segmentation prediction data obtained after a segmentation type of each pixel in the to-be-examined picture is predicted; and a result determining unit 93, configured to determine a damage detection result for the to-be-examined picture based on the box prediction data and the segmentation prediction data.

In an implementation, the result determining unit 93 is configured to: determine that the damage detection result is that the to-be-examined picture includes no damaged object when the box prediction data does not indicate a damage prediction box or the segmentation prediction data does not indicate a damaged object region, where the damaged object region is a connected region whose area is greater than a specific threshold and that is formed by a set of pixels whose predicted segmentation types are the same type.

In an implementation, the box prediction data indicates at least one damage prediction box, and the segmentation prediction data indicates at least one damaged object region. In this case, the result determining unit 93 is configured to determine the damage detection result for the to-be-examined picture based on the at least one damage prediction box and the at least one damaged object region.

Specifically, in an implementation, the result determining unit 93 is configured to: use a union set of a region set corresponding to the at least one damage prediction box and a region set corresponding to the at least one damaged object region as the damage detection result.

In an implementation, the at least one damage prediction box includes a first damage prediction box, and the result determining unit 93 is configured to remove the first damage prediction box from the damage detection result if intersection-over-union between the first damage prediction box and each damaged object region is less than a predetermined threshold.

In another implementation, the result determining unit 93 can be further configured to remove the first damage prediction box from the damage detection result if a proportion of an intersection area between the first damage prediction box and each damaged object region to a box area of the first damage prediction box is less than a predetermined threshold.

In an implementation, the at least one damage prediction box includes a first damage prediction box, the box prediction data further includes a first damage type predicted for the first damage prediction box, the at least one damaged object region includes a first damaged object region, and a pixel in the first damaged object region corresponds to a first segmentation type. In this case, the result determining unit 93 can be configured to: determine the first damage prediction box as an abnormal prediction box or determine the first damaged object region as an abnormal region if intersection-over-union between the first damage prediction box and the first damaged object region is greater than a predetermined threshold, but the first damage type and the first segmentation type are not correlated.

By using the apparatuses in FIG. 8 and FIG. 9, the weak segmentation damage detection model is trained based on the weak mark data, and a damaged object is recognized from a picture by using the model.

According to an implementation of another aspect, a computer readable storage medium is provided. The computer readable storage medium stores a computer program, and when the computer program is executed in a computer, the computer is enabled to perform the method described with reference to FIG. 2 and FIG. 6.

According to an implementation of still another aspect, a computing device is further provided, and includes a memory and a processor. The memory stores executable code, and when the processor executes the executable code, the method described with reference to FIG. 2 and FIG. 6 is implemented.

A person skilled in the art should be aware that in the previous one or more examples, functions described in the present disclosure can be implemented by hardware, software, firmware, or any combination thereof. When the functions are implemented by software, the functions can be stored in a computer readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for damage detection, comprising:
    obtaining, by one or more computing devices, a sample image to be examined;
    inputting the sample image into a weak segmentation damage detection model, wherein the weak segmentation damage detection model comprises a box prediction branch and a segmentation prediction branch distinct from the box prediction branch,
    determining, using the box prediction branch, one or more damage prediction boxes in the sample image, each damage prediction box framing predicted damage in the sample image;
    determining, using the segmentation prediction branch, a type of damage for each pixel of a plurality of pixels in the sample image, the determination of the type of damage for each pixel being independent of the determination of the one or more damage prediction boxes; and
    determining, based on the one or more damage prediction boxes output by the box prediction branch and the determined type of damage for each pixel output by the segmentation prediction branch, whether damage is detected in the sample image.

2. The computer-implemented method of claim 1, wherein determining whether damage is detected in the sample image comprises:
    determining that no portion of the plurality of pixels have a matching type of damage and form a connected region having an area greater than a specified threshold area; and
    based on determining that no portion of the plurality of pixels have a matching type of damage and form a connected region having an area greater than the specified threshold area, determining that damage is not detected in the sample image.

3. The computer-implemented method of claim 1, wherein determining whether damage is detected in the sample image comprises:
  determining that at least a portion of the plurality of pixels have a matching type of damage and form a connected region having an area greater than a specified threshold area, the at least the portion of the plurality of pixels forming a damaged object region; and
  determining, based on the one or more damage prediction boxes and the damaged object region, whether damage is detected in the sample image.

4. The computer-implemented method of claim 3, wherein determining whether damage is detected in the sample image comprises:
  forming a union region of a first damage prediction box of the damage prediction boxes and the damaged object region; and
  determining, based on the union region, whether damage is detected in the sample image.

5. The computer-implemented method of claim 3, wherein determining whether damage is detected in the sample image comprises:
  determining that an intersection-over-union of a first damage prediction box of the damage prediction boxes and the damaged object region is less than a predetermined threshold; and
  based on determining that the intersection-over-union is less than the predetermined threshold, removing the first damage prediction box from consideration when determining whether damage is detected in the sample image.

6. The computer-implemented method of claim 3, wherein a first damage prediction box of the damage prediction boxes corresponds to a damage prediction type, and wherein determining whether damage is detected in the sample image comprises:
  determining that an intersection-over-union of the first damage prediction box and the damaged object region is greater than a predetermined threshold; and
  determining whether the damage prediction type correlates with the matching type of damage of pixels of the damaged object region.

7. The computer-implemented method of claim 3, wherein a first damage prediction box of the damage prediction boxes corresponds to a damage prediction type, and wherein determining whether damage is detected in the sample image comprises:
  determining that the damage prediction type does not correlate with the matching type of damage of pixels of the damaged object region; and
  based on determining that the damage prediction type does not correlate with the matching type of damage of pixels of the damaged object region, determining that the first damage prediction box, the damaged object region, or both are abnormal.

8. A non-transitory, computer-readable medium storing one or more instructions executable by a computer system to perform operations for damage detection, the operations comprising:
  obtaining, by one or more computing devices, a sample image to be examined;
  inputting the sample image into a weak segmentation damage detection model, wherein the weak segmentation damage detection model comprises a box prediction branch and a segmentation prediction branch distinct from the box prediction branch,
  determining, using the box prediction branch, one or more damage prediction boxes in the sample image, each damage prediction box framing predicted damage in the sample image;
  determining, using the segmentation prediction branch, a type of damage for each pixel of a plurality of pixels in the sample image, the determination of the type of damage for each pixel being independent of the determination of the one or more damage prediction boxes; and
  determining, based on the one or more damage prediction boxes output by the box prediction branch and the determined type of damage for each pixel output by the segmentation prediction branch, whether damage is detected in the sample image.

9. The computer-readable medium of claim 8, wherein determining whether damage is detected in the sample image comprises:
  determining that no portion of the plurality of pixels have a matching type of damage and form a connected region having an area greater than a specified threshold area; and
  based on determining that no portion of the plurality of pixels have a matching type of damage and form a connected region having an area greater than the specified threshold area, determining that damage is not detected in the sample image.

10. The computer-readable medium of claim 8, wherein determining whether damage is detected in the sample image comprises:
  determining that at least a portion of the plurality of pixels have a matching type of damage and form a connected region having an area greater than a specified threshold area, the at least the portion of the plurality of pixels forming a damaged object region; and
  determining, based on the one or more damage prediction boxes and the damaged object region, whether damage is detected in the sample image.

11. The computer-readable medium of claim 10, wherein determining whether damage is detected in the sample image comprises:
  forming a union region of a first damage prediction box of the damage prediction boxes and the damaged object region; and
  determining, based on the union region, whether damage is detected in the sample image.

12. The computer-readable medium of claim 10, wherein determining whether damage is detected in the sample image comprises:
  determining that an intersection-over-union of a first damage prediction box of the damage prediction boxes and the damaged object region is less than a predetermined threshold; and
  based on determining that the intersection-over-union is less than the predetermined threshold, removing the first damage prediction box from consideration when determining whether damage is detected in the sample image.

13. The computer-readable medium of claim 10, wherein a first damage prediction box of the damage prediction boxes corresponds to a damage prediction type, and wherein determining whether damage is detected in the sample image comprises:
  determining that an intersection-over-union of the first damage prediction box and the damaged object region is greater than a predetermined threshold; and determining whether the damage prediction type correlates with the matching type of damage of pixels of the damaged object region.

14. The computer-readable medium of claim 10, wherein a first damage prediction box of the damage prediction boxes corresponds to a damage prediction type, and wherein determining whether damage is detected in the sample image comprises:
   determining that the damage prediction type does not correlate with the matching type of damage of pixels of the damaged object region; and
   based on determining that the damage prediction type does not correlate with the matching type of damage of pixels of the damaged object region, determining that the first damage prediction box, the damaged object region, or both are abnormal.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for damage detection, the operations comprising:
   obtaining, by one or more computing devices, a sample image to be examined;
   inputting the sample image into a weak segmentation damage detection model, wherein the weak segmentation damage detection model comprises a box prediction branch and a segmentation prediction branch distinct from the box prediction branch,
   determining, using the box prediction branch, one or more damage prediction boxes in the sample image, each damage prediction box framing predicted damage in the sample image;
   determining, using the segmentation prediction branch, a type of damage for each pixel of a plurality of pixels in the sample image, the determination of the type of damage for each pixel being independent of the determination of the one or more damage prediction boxes; and
   determining, based on the one or more damage prediction boxes output by the box prediction branch and the determined type of damage for each pixel output by the segmentation prediction branch, whether damage is detected in the sample image.

16. The computer-implemented system of claim 15, wherein determining whether damage is detected in the sample image comprises:
   determining that no portion of the plurality of pixels have a matching type of damage and form a connected region having an area greater than a specified threshold area; and
   based on determining that no portion of the plurality of pixels have a matching type of damage and form a connected region having an area greater than the specified threshold area, determining that damage is not detected in the sample image.

17. The computer-implemented system of claim 15, wherein determining whether damage is detected in the sample image comprises:
   determining that at least a portion of the plurality of pixels have a matching type of damage and form a connected region having an area greater than a specified threshold area, the at least the portion of the plurality of pixels forming a damaged object region; and
   determining, based on the one or more damage prediction boxes and the damaged object region, whether damage is detected in the sample image.

18. The computer-implemented system of claim 17, wherein determining whether damage is detected in the sample image comprises:
   forming a union region of a first damage prediction box of the damage prediction boxes and the damaged object region; and
   determining, based on the union region, whether damage is detected in the sample image.

19. The computer-implemented system of claim 17, wherein determining whether damage is detected in the sample image comprises:
   determining that an intersection-over-union of a first damage prediction box of the damage prediction boxes and the damaged object region is less than a predetermined threshold; and
   based on determining that the intersection-over-union is less than the predetermined threshold, removing the first damage prediction box from consideration when determining whether damage is detected in the sample image.

20. The computer-implemented system of claim 17, wherein a first damage prediction box of the damage prediction boxes corresponds to a damage prediction type, and wherein determining whether damage is detected in the sample image comprises:
   determining that an intersection-over-union of the first damage prediction box and the damaged object region is greater than a predetermined threshold; and
   determining whether the damage prediction type correlates with the matching type of damage of pixels of the damaged object region.

* * * * *